United States Patent [19]

Gluntz et al.

[11] Patent Number: 5,059,385
[45] Date of Patent: Oct. 22, 1991

[54] ISOLATION CONDENSER PASSIVE COOLING OF A NUCLEAR REACTOR CONTAINMENT

[75] Inventors: Douglas M. Gluntz; Franklin E. Cooke, both of San Jose, Calif.

[73] Assignee: General Electric Company, San Jose, Calif.

[21] Appl. No.: 519,070

[22] Filed: May 4, 1990

[51] Int. Cl.$^5$ .............................................. G21C 15/18
[52] U.S. Cl. .................................... 376/282; 376/283; 376/299
[58] Field of Search ............... 376/282, 283, 293, 298, 376/299

[56] References Cited

U.S. PATENT DOCUMENTS 3,929,567 12/1975 Schabert et al. ..................... 376/282

FOREIGN PATENT DOCUMENTS 182697 8/1987 Japan .................................... 376/283
75691 4/1988 Japan .................................... 376/283

Primary Examiner—Daniel D. Wasil
Attorney, Agent, or Firm—R. R. Schroeder

[57] ABSTRACT

A nuclear reactor system which includes a containment uses, upon loss-of-coolant event, an isolation condenser submerged in a large supply of water and elevated some distance above the system pressure vessel to effect both initial and decay heat dissipation cooling in the containment. The isolation condenser has inlet thereto communicated to an open entry conduit disposed in the containment so that steam and heated gasses in the containment space enter the isolation condenser and are cooled. Condensate resulting from the cooling is returned to an elevated system gravity coolant supply pool, which pool is used for replenishing coolant lost from the pressure vessel, the return being through a return conduit that has a lower end section configured with a water trap with non-condensable gasses present in the steam being separated from the condensate and vented to the suppression pool. The condensate flow to the gravity pool thus supplements this stock as a core cooling source and continues to do so after the original gravity supply pool stock is exhausted, the condenser function and condensate effusion therefrom continuing during cooldown and decay heat removal, the effusion flow of condensate entering the empty gravity pool chamber as discharge from the water trap end of the return conduit and gravity feeding as an outflow therefrom into the pressure vessel through the gravity pool piping connection with the vessel.

5 Claims, 1 Drawing Sheet

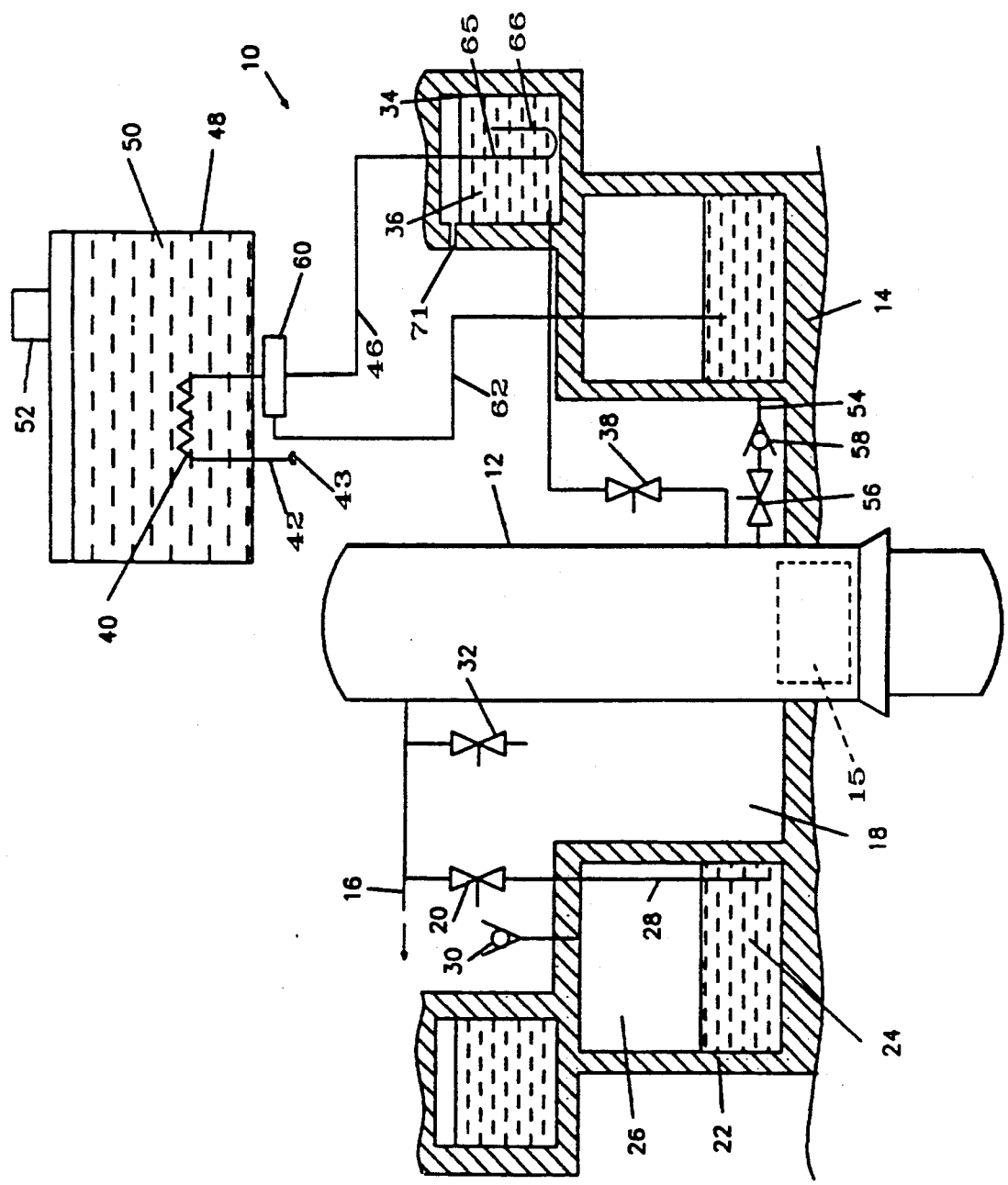

ISOLATION CONDENSER PASSIVE COOLING OF A NUCLEAR REACTOR CONTAINMENT

BACKGROUND OF THE INVENTION

The present invention relates to passive heat removal from a nuclear reactor containment airspace with use of an isolation condenser that cools a mixture of steam and heated gasses present in the containment airspace as a consequence of a reactor system loss-of-coolant accident (LOCA), the steam and heated gas mixture entering the isolation condenser from the containment airspace through an open entry conduit and communicating within the isolation condenser with the primary side of a heat exchanger section, whereupon within the heat exchange section heat is transferred to a cooling water medium supplied to the secondary side of the heat exchange section and steam is condensed and returned as cool condensate back to that containment airspace through a return conduit and non-condensable gasses are discharged downstream from the heat exchange section through a conduit communicating to an enclosed space within the containment maintained at a lower pressure than the containment airspace pressure.

The invention is particularly directed to effecting more immediate and/or advantageous utilization, following a LOCA event, of the return condensate for cooling of the reactor and/or containment airspace as well as use in a water trap placed in the isolation condenser condensate return conduit with the water trap so proportioned as to restrict backflow entry into the condensate return conduit of steam and heated gasses present in the containment airspace, where lacking such water trap effect, the containment gas mixture could bypass the condenser heat exchange section while gaining entry to the enclosed space that is being maintained at lower pressure without first being cooled within the heat exchange section.

Commonly assigned applications Ser. Nos. 07/325,729 and 07/432,246 filed Mar. 20, 1989 and Nov. 6, 1989, respectively, disclose nuclear systems wherein various manners and means can be employed for passive heat removal from a system containment space in the happening of a loss-of-coolant accident or event such as a break in a steam pipe or the pressure vessel, or the loss of coolant in the pressure vessel by other cause. Both of the disclosed systems dissipate initial heat by venting steam from the pressure vessel to a suppression pool. Also, both systems employ an elevated gravity driven cooling pool which when pressure in the pressure vessel reduces to a certain level, flows by force of gravity into the pressure vessel to replace any loss of coolant therein. Both systems also employ elevated isolation condensers which are submerged in a large water supply, for initial cooling and for decay heat dissipation as well. In the '729 application system, the pressure vessel is vented through a designated line to the isolation condenser and steam is cooled and returned to the pressure vessel. After a time when pressure in the pressure vessel is below that in the containment space, an opened vent valve on the pressure vessel admits steam and heated gasses present in the containment to and through the pressure vessel from whence it flows to the isolation condenser, is condensed and returned as cooled condensate to the pressure vessel. The '246 application system on the other hand, has no communication with the pressure vessel. An open entry conduit is disposed in the containment space and from outset of an event, steam and heated gasses such as nitrogen present in the containment, can flow into this open entry conduit and access the isolation condenser for cooling, with the cooled condensate then being passed through a return conduit into an enclosed volume or space within the containment commonly referred to as a wetwell, within which is a pool of water, i.e., a suppression pool, over which suppression pool there is a gas volume or wetwell airspace. Non-condensable gases such as nitrogen are separated from the condensate and vented to the suppression pool through the force of a pressure differential that is at certain times maintained or exists between the respective containment airspace and the wetwell airspace.

The systems of both applications work well for the purposes for which designed, but it is noted that removal of containment space heat by way of the isolation condenser, does not occur for some time following an event in the '729 application system and until such time as pressure vessel pressure is lower than containment space pressure so that steam and heated gasses can pass therefrom into the pressure vessel for passage to the isolation condenser and cooling therein. The '246 application system having an open entry conduit in the containment connected to the isolation condenser, effects containment space cooling at outset of an event since containment space steam and heated gasses always have free access to this isolation condenser entry flow path. The '246 application system returns cooled condensate to the suppression pool, i.e., a location from which it may be required, during system cooldown, that the water therein be flowed into the pressure vessel to protectively cover the reactor core. Depending on the pressure in the pressure vessel and the location of the core in the pressure vessel relative to suppression pool level, the suppression pool water may lack sufficient hydrostatic head to enter the pressure vessel and cover the core, the condensate return from the isolation condenser having expended substantially all the hydrostatic head it possessed at isolation condenser elevation on flow entry to and commingling with the suppression pool water its addition to the pool not increasing pool head of any significance to the suppression pool. The condensate return from the isolation condenser in the '729 application system possesses vessel pressure countering inflow head since it is direct returned to the pressure vessel without commingling with any intermediate stock of coolant. It is seen then that both application systems have advantage. The '729 system allows for early replenishment of pressure vessel coolant to cover the reactor core, but there is some time lapse before the isolation condenser can function to dissipate containment space steam and heated gasses thermal loads. The '246 system is capable of immediate extraction of containment space heat present as steam and heated gasses, but the cool condensate generated by this cooling cannot most effectively be used for core coolant purpose by reason of its being returned to the suppression pool.

It is desirable therefore, that improved loss-of-coolant event passive cooling capacity and flexibility involving use of isolation condensers be provided in a nuclear reactor system.

OBJECTS AND SUMMARY OF THE INVENTION

Accordingly, it is an object of the invention to provide an isolation condenser passive cooling operation in a nuclear reactor containment which overcomes the drawbacks of the prior art.

It is a further object of the invention to provide an isolation condenser passive cooling for a nuclear reactor containment space which upon occurrence of a loss-of-coolant event immediately functions to effect containment space cooling and to initiate with water condensate discharging therefrom supplement for, and replenishment of, an elevated gravity driven cooling water pool used for flowing coolant into the pressure vessel to replace any lost in the event thereby to insure that coolant always covers the reactor core.

It is a still further object of the invention to provide that cooled condensate is returned from the isolation condenser to an elevated location relative to the pressure vessel and particularly the core therein so that the condensate has sufficient hydrostatic head to flow into the pressure vessel.

Another object is to return condensate from the isolation condenser to a gravity driven cooling water pool and with a return conduit that has a water seal to restrict entry of heated steam-gas mixture to this conduit upon emptying of the cooling pool, which heated steam-gas mixture entry could thereby enter a vent line connected to the suppression pool and bypass the heat exchange section of the isolation condenser and thus add heat to the suppression pool which should be rejected from the steam-gas mixture preferably by way of cooling in the isolation condenser.

Briefly stated, there is provided a nuclear reactor system which includes a containment and upon loss-of-coolant event uses an isolation condenser submerged in a large supply of water and elevated some distance above the system pressure vessel to effect both initial and decay heat dissipation cooling in the containment. The isolation condenser has inlet thereto communicated to an open entry conduit disposed in the containment so that steam and heated gasses in the containment airspace enter the isolation condenser, therein being directed into the heat exchange section of the isolation condenser and are cooled. Downstream from the heat exchange section condensate resulting from the cooling is returned to an elevated system gravity coolant supply pool, which pool is used for replenishing coolant lost from the pressure vessel, the return being through a return conduit that has a lower end section configured with a water trap, and with non-condensable gas present in the inlet gas mixture becoming substantially separated from the steam and condensate and vented to a suppression pool via a conduit terminating at an appropriate submergence therein. The condensate flow to the gravity pool thus supplements this gravity pool stock as a core cooling source and continues to do so after the original gravity supply pool stock is exhausted, the condenser function and condensate effusion therefrom continuing during cooldown and decay heat removal, the effusion flow of condensate entering the empty gravity pool chamber as discharge from the water trap end of the return conduit and gravity feeding as an outflow therefrom into the pressure vessel through the gravity pool piping connection with the vessel.

In accordance with these and other objects of the invention, there is provided a nuclear system comprising a containment airspace in which a nuclear reactor pressure vessel is disposed there being a reactor core within said pressure vessel. A heat exchanger is elevated a distance above said pressure vessel and a pool of water surrounds the heat exchanger, with there being means for venting said pool of water to an environment outside the containment. A heat exchanger entry conduit is disposed in the containment and has an open lower end communicating with the containment space, and an upper end connected to the heat exchanger, with water-containing heated steam and non-condensables gas mixture present in the containment space incident a pressure vessel loss of coolant event entering and flowing through said entry conduit into said heat exchanger for cooling said fluid to convert water vapor therein to a condensate. A gravity driven cooling water pond-containing space is elevated a distance above said pressure vessel and sufficient such that upon occurrence of an event and when pressure in said pressure is reduced to a predetermined level, cooling water will gravity flow from the pool into said pressure vessel through a piping means connected therewith so that the water can cover said core. A condensate return is provide and has an upper end connected to the heat exchanger and a lower outlet end disposed in said gravity driven cooling water space, the water condensate gravity feeding from the heat exchanger to supplement the water in said pond and upon depletion of said pond gravity outflowing from the space through said piping means to said pressure vessel.

According to the invention, the condensate lower outlet end is configured as a water trap to thereby provide a water seal in the return conduit which restricts any entry flow of heated steam and non-condensables from the containment space to the return conduit. Heated fluid if same could access a flow into the return conduit, might thereby bypass the isolation condenser and divert directly into the suppression pool retaining heat in the containment that should be transferred outwardly of the containment via the isolation condenser.

The above, and other objects, features and advantages of the present invention will become apparent from the following description read in conjunction with the accompanying drawing, in which like reference numerals designate the same elements.

BRIEF DESCRIPTION OF THE DRAWINGS

The accompanying single FIGURE of drawing is a schematic depiction of the nuclear reactor system employing passive heat removal in accordance with the principles of the present invention.

DETAILED DESCRIPTION OF THE PREFERRED EMBODIMENT

The present invention is concerned with removal of containment space heat which in certain instances and where not subjected to appropriate and timely removal procedure, can have some adverse effect on the containment structure and system components within the containment. Generally though and with most nuclear systems, upon occurrence of an event such as steam pipe failure, the initial heat evolved in the containment from escaping steam as well as that vented from the pressure vessel will be taken up by venting this steam to a suppression pool. Further and because there generally will be an accompanying loss of coolant from the pressure vessel, a gravity driven water cooling pool will be opened to supply coolant to the pressure vessel to insure that the core fuel rods therein are maintained submerged in water. The gravity flow will continue for a period of time, e.g., about 30 minutes. Depending on suppression pool level, the water therein may also be used for core fuel rod submergence purpose but only if suppression pool water is available and the core fuel rod location relative to the level of the suppression pool allows for suppression pool hydrostatic head to overcome pressure vessel internal pressure. If not, another source of pressure vessel coolant must be used as, for example, the condensate from isolation condenser cooling as detailed in the earlier referred-to '729 application. The earlier referred to '246 application deals with immediate isolation condenser containment space heat removal but the resulting condensate in returning to the suppression pool cannot be accounted as a pressure vessel coolant replacement because of possible hydrostatic head considerations. The present invention has the advantage that it accomplishes both immediate cooling of heated fluid present in the containment space, and replenishment of core submergence coolant source. As used herein it is understood that "heated fluid" means steam and non-condensable gasses, principally nitrogen, as evolve and exist in the containment incident an event.

Referring to the drawing, the nuclear reactor system 10 includes pressure vessel 12 disposed in a containment space enclosed by containment building 14, there being a nuclear reactor core 15 within the pressure vessel. The core location depicted is one found in many of current systems and its relative location to suppression pool 22 and the level of water 24 therein indicates that coolant flow from the suppression pool through equalizer line 54 to the pressure vessel for core fuel rod submergence may not be possible until some interval into the post event time period when pressure vessel internal pressure is reduced to a level as will allow inflow from pool 22 since as is graphically apparent, comparatively minimal hydrostatic head difference exists between the core fuel rod tops and the suppression pool level. Control valve 56 may be opened but the check valve 58 backed by the higher vessel pressure will not open until the head of pool 22 exceeds pressure vessel pressure.

Upon occurrence of a loss-of-coolant event such as a break in main steam line 16, break in vessel 12 or the like, the vessel can be depressurized by the opening of valve 32 and additionally, steam relief valve 20 is opened so that steam is vented by the latter to suppression pool 22 and the former to the containment space. The highly heated fluid products in the containment will include additionally to the steam, inert gasses such as nitrogen as well as trace quantities of other gasses. Immediately following happening of the loss-of-coolant event, pressure peaking in the containment will take place and consequent that, venting of the containment to the suppression pool by way of vents in the suppression pool structure (not shown) will take place.

The cooling of heated fluids in the containment is accomplished with isolation condenser 40 disposed in elevated isolation pool 48, the heat from the fluid being given up to the water 50 in the pool, with the pool in turn vented by means of stack 52 to an environment outside the containment so that boil off of water 50 carries this removed heat out of the system.

Isolation condenser 40 has an inlet conduit 42, the lower end of which as at 43 has open entry so that heated fluids always can access the isolation condenser, this arrangement insuring that containment space cooling is passive, with the upper end of the inlet conduit being connected to the isolation condenser heat transfer coil. A condensate outlet conduit 46 has its upper end connected to the isolation condenser coil outlet and it extends downwardly so that its lower outlet end section 65 is disposed in the space of an elevated gravity driven coolant supply pool 34, this pool holding a stock of water 36 which at appropriate time is and upon opening of coolant supply valve 38, supplied to pressure vessel 12 to make up coolant loss from that vessel and maintain submergence of the fuel rods of core 15 in coolant.

When the heated fluid is cooled in the isolation condenser, the steam therein is converted to relatively cool water condensate, with non-condensable gasses such as nitrogen being cooled as well but requiring separation from the condensate. Collector means such as chamber 60 is provided in the isolation condenser outlet circuit to collect these non-condensables and divert them through vent pipe 62 to outlet in the suppression pool below the level of water 24. Within the suppression pool, the non-condensables rise to the air space 26 over the water and whenever the head pressure in the air space exceeds containment pressure, breaker valve 30 will open to vent the air space to the containment.

Normally, the lower outlet section 65 of the condensate return conduit will be submerged in water 36 of pool 34 and any condensate outletting from the condenser simply will supplement the stock of pool coolant. However, following containment venting to the suppression pool, and with valve 38 opened and pressure vessel internal pressure being lowered to a value allowing such entry flow thereto, coolant from pool 34 will flow into the pressure vessel to replace coolant lost incident the event. This flow will continue as a major element of system initial heat cooldown for a period of time, e.g., 15–30 minutes until the pool stock becomes exhausted. However, cool condensate from the isolation condenser cooling operation is utilized to continue gravity feed of coolant to the pressure vessel, this condensate entering the gravity pool space and outflowing to the pressure vessel through the piping which connects those elements. The gravity pool space has an equalizing vent 71 which communicates the containment space with the pool space. Thus the space pressure in each is substantially the same. Following exhausting of pool water 36, the outlet end of condensate return conduit 46 would be uncovered so that higher pressure heated fluid present in the emptied pool space could enter the return conduit, flow through this conduit, the collection chamber and pass into the vent pipe 62 whence it would pass into the suppression chamber, thereby bypassing the isolation condenser cooling operation with the result that a thermal loading in the containment which should be transferred to an environment outside the containment remains within the containment, merely being displaced from one to a different location.

To restrict possibility of the backflow of heated fluids from the containment to the suppression pool via the condensate return conduit, the lower end outlet section of that conduit is configured as a water trap 66. Thus a water seal exists in the return conduit to allow outflow from the conduit of condensate but restrict any inflow of heated fluids past the water seal. The water seal is established in the two parallel legs and U connection section that joins these legs. With pressure equalized in the containment and pool space 34, the water seal insures that back flow of heated fluids into the return conduit will not take place.

Condensate flow from the isolation condenser will continue throughout decay heat cooling and such condensate will flow or effuse into the emptied pool space 34 and the pressure vessel as long as system cooling is occurring.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A nuclear system comprising a containment airspace in which a nuclear reactor pressure vessel is disposed there being a reactor core within said pressure vessel, said system comprising:
 a heat exchanger elevated a distance above said pressure vessel;
 a pool of water surrounding said heat exchanger;
 means for venting said pool of water to an environment outside said containment;
 a heat exchanger entry conduit within said containment, said entry conduit having an open lower end communicating with the containment space, and an upper end connected to said heat exchanger, water-containing heated fluid present in the containment airspace incident a pressure vessel loss of coolant event entering and flowing through said entry conduit into said heat exchanger for cooling said fluid to convert water vapor therein to a condensate and separate non-condensable gasses therefrom;
 a gravity driven cooling water pond-containing space, said gravity cooling water space being elevated a distance above the core in said pressure vessel sufficient for cooling water upon occurrence of an event and when pressure in said presure vessel is reduced to a predetermined level, to gravity feed into said pressure vessel through a piping means connected therewith so that the water can cover said core; and
 a condensate return conduit, said return conduit having an upper end connected to said heat exchanger and a lower outlet end disposed in said gravity driven cooling water space below the normal cooling water level in said space, the water condensate gravity feeding from the heat exchanger to supplement the water in said pond and upon depletion of said pond gravity outflowing from the space through said piping means to said pressure vessel.

2. A nuclear system in accordance with claim 1, further comprising a condensate/non-condensable gas collector means at the outlet side of said return condensate conduit, and vent means for communicating non-condensable gasses collected with said collector means to a suppression pool.

3. A nuclear system in accordance with claim 2, in which said return conduit lower outlet end is configured as a water trap so that a water condensate seal is maintained in said return conduit to restrict backflow entry of any heated fluid which may enter the gravity driven cooling water space from the containment airspace following depletion of water from said gravity water space, into said return conduit outlet end from whence it could pass through the collector means and flow through said vent means to the suppression chamber without being subjected to cooling thereof in the isolation condenser.

4. A nuclear system in accordance with claim 3, in which said water trap comprises a lower condensate return conduit length section shaped as a U with spaced vertical, parallel parts and an arcuate part connecting a bottom of one vertical part with that of the other.

5. In a nuclear system comprising a containment airspace in which a nuclear reactor pressure vessel is disposed there being a reactor core within said pressure vessel, and comprising:
 a heat exchanger elevated a distance above said pressure vessel and surrounded by a pool of water, there being means for venting said pool of water to an environment outside said containment;
 a heat exchanger having an open entry conduit within said containment through which water-containing heated fluid present in the airspace is passed into said heat exchanger for cooling said fluid to convert water vapor therein to a condensate and separate non-condensable gasses therefrom; and
 a gravity driven cooling water pond-containing space elevated a distance above the core in said pressure vessel sufficient for cooling water upon occurrence of an event to gravity feed into the pressure vessel through a piping means connected therewith for cooling said core;
 a condensate return conduit for gravity feeding water condensate from the heat exchanger to the gravity pool space, said return conduit having an upper end connected to said heat exchanger and a lower end disposed in the gravity pool space below the normal cooling water level in said space, a lower end section of said return conduit being configured as a water trap to maintain a water seal in said return conduit whenever the water level of the gravity pool falls below said condensate return conduit lower end outlet.

* * * * *